P. Dickson,

Cider Mill.

N°44,408. Patented Sep. 27, 1864.

Witnesses.
J. P. Hall.
Wm. P. McNamara

Inventor.
Perry Dickson

UNITED STATES PATENT OFFICE.

PERRY DICKSON, OF ERIE, PENNSYLVANIA.

IMPROVEMENT IN CIDER-MILLS.

Specification forming part of Letters Patent No. 44,408, dated September 27, 1864.

*To all whom it may concern:*

Be it known that I, PERRY DICKSON, of Erie, in county of Erie and State of Pennsylvania, have invented a new and Improved Machine for grinding apples and vegetables or roots; and I do hereby declare that the following is a full, clear, and exact description thereof, which will enable those skilled in the art to make and use the same, reference being had to the accompanying drawings, forming part of the specification, in which—

Figure 1:
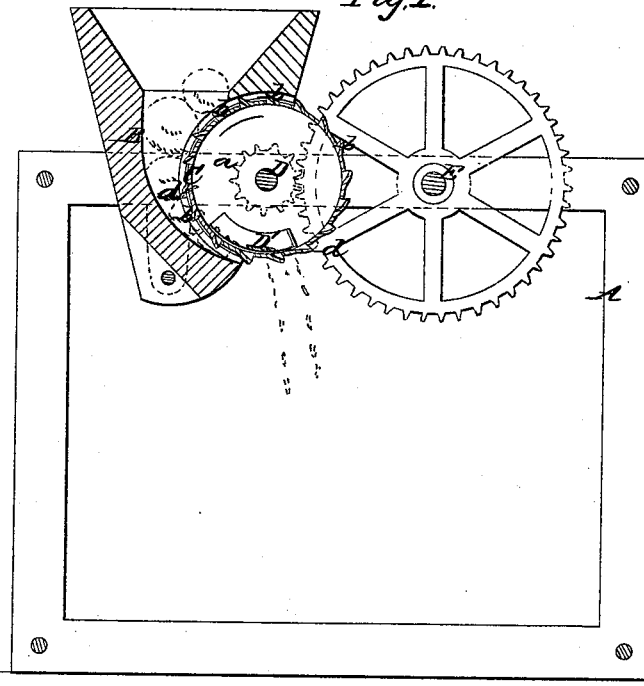
Figure 2:
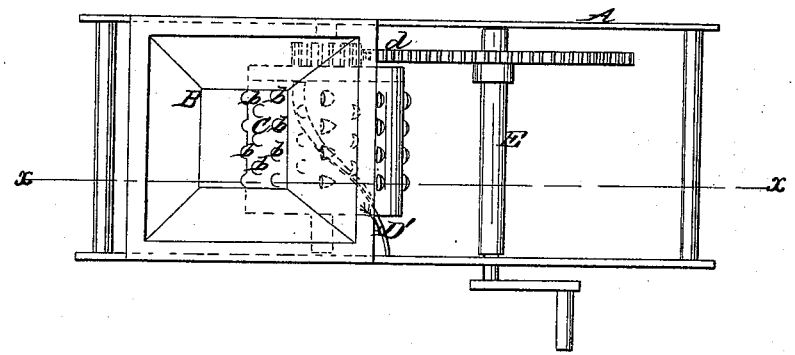
Figure 3:
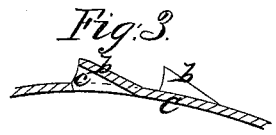

Figure 1 is a side sectional view of my invention, taken in the line $x\, x$, Fig. 2; Fig. 2, a plan or top view of the same; Fig. 3, an enlarged view of a portion of the grinding-cylinder.

Similar letters of reference indicate corresponding parts.

This invention relates to an improvement on what is generally known as the "grater mill," for grinding apples for the manufacture of cider, said mill being also applicable to the grinding of other vegetables or roots.

This grater mill consists of a cylinder provided with a series of teeth at its periphery, for grating, cutting, or rasping the apples or vegetables, and the cylinder in a short time after the commencement of its work is liable to become choked, clogged, or gummed up, as there is no escape for the particles of cut apples or vegetables from the cylinder.

The object of my invention is to obviate this difficulty; and it consists in constructing the grinding-cylinder of sheet metal perforated in such a manner as to form teeth and openings for the cut particles of apples or vegetables to pass within the cylinder, and thereby admit of the cylinder being kept perfectly clean, so that it will operate perfectly.

A represents a framing, which may be constructed in any proper manner to support the working parts, and B is a hopper, which is placed on said framing, and in one side of which the grater-cylinder C operates or works, as shown clearly in Fig. 1. This cylinder C is constructed of sheet metal, closed at one end by a circular head, $a$, and open at the opposite end, and is fitted on a shaft, D, the bearings of which are on the framing A.

The cylinder C is perforated with holes, the punch being driven through the sheet metal from the inner side of the cylinder, so as to make a clean cut at one side and form a gouge-shape projection or tooth, $b$, with an opening, $c$, gradually widening from its outer to its inner end, so as to admit of the particles cut by the teeth $b$ escaping freely through the openings $c$ into the cylinder.

The lower part of the interior of the hopper B is of curved form, and gradually diminishes in width from its upper to its lower end, as shown at $d$, to form a throat to admit of the cylinder C acting efficiently upon the apples or vegetables. (See Fig. 1.)

D' is a scraper, which is attached to the framing A and projects within the cylinder C. This scraper is of spiral form, and is designed for discharging the ground apples or vegetables from the interior of the cylinder.

The cylinder C may be rotated by gears $d$ from a driving-shaft, E. The apples or vegetables are placed in the hopper B, and they pass down into the narrow part or throat $d$, and are acted upon by the cylinder C, the cut particles passing through the openings $c$ into the cylinder C, from which they are scraped and discharged by the scraper D'.

Thus by this simple arrangement I obtain a grater-mill which will operate perfectly or efficiently at all periods while at work, as the cylinder cannot be gummed up with the cut apples or vegetables, but will be kept clean at all times.

I claim as new and desire to secure by Letters Patent—

The combination of the cylinder, having teeth made by punching holes from the inside, in combination with the spiral or oblique scraper for removing the pomace that passes through the perforations, substantially as described and represented.

PERRY DICKSON.

Witnesses:
J. P. HALL,
WM. P. MCNAMARA.